(No Model.)
J. H. MILLEN.
FILTER.
No. 445,568. Patented Feb. 3, 1891.
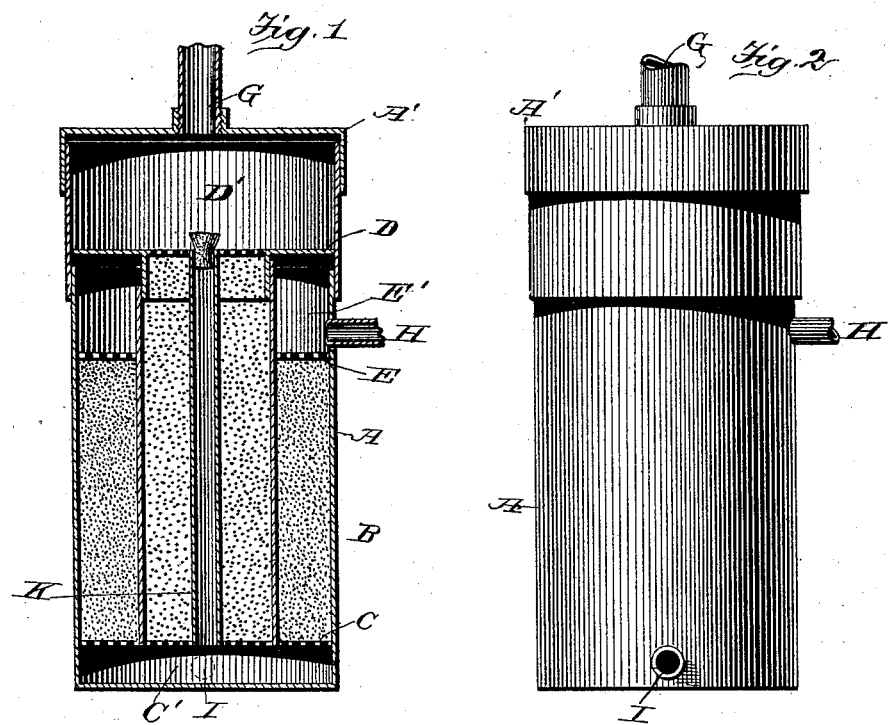
Witnesses
A. P. Cornwall
L. S. Bacon
Inventor
James H. Millen
By Jos. H. Hunter
Atty.

UNITED STATES PATENT OFFICE.

JAMES H. MILLEN, OF BLOOMINGTON, INDIANA.

FILTER.

SPECIFICATION forming part of Letters Patent No. 445,568, dated February 3, 1891.

Application filed September 24, 1890. Serial No. 366,018. (No model.)

*To all whom it may concern:*

Be it known that I, JAMES H. MILLEN, a citizen of the United States, residing at Bloomington, in the county of Monroe and State of Indiana, have invented certain new and useful Improvements in Filters, of which the following is a specification, reference being had therein to the accompanying drawings.

My invention relates to an improvement in filters; and it consists in the construction and arrangement of parts hereinafter described, and definitely pointed out in the claim.

The object of my invention is to provide a cheap, durable, effective, and easily-cleaned filter. I obtain this object by the construction illustrated in the accompanying drawings, wherein like letters of reference indicate corresponding parts in the several views, and in which—

Figure 1 is a vertical section. Fig. 2 is a front elevation.

In the drawings, A represents the outer casing, cylindrical in form. Within the casing, a short distance from the same, is an inner casing B, the top of which extends up to the top of the casing and its lower edge resting on a horizontal perforated plate C, rigidly secured to the sides of the casing a short distance from its bottom. The perforations in this plate are arranged in two groups—an outer and inner group—between which the inner casing is secured. In the upper part of the inner casing is a perforated plate D, forming a water-space D' between it and the top A'. In the space F between the inner and outer casing, a short distance below the plane of the plate D, is secured a perforated plate E, forming a filtered-water space E' between it and the top.

G represents a supply-opening in the cap for supplying water to the filter.

H is a draw-off located in the outer casing at the bottom of the filtered-water space E'.

In the lower end of the casing, in the space C'' between the perforated plate C and the bottom of the filter, is a blow-out plug or cleaning-cock I. The spaces between the perforated plates are filled with any suitable filtering material, such as charcoal, sand, &c.

It will be noticed that the filter is formed with flat ends, so that the sand may be removed for cleaning purposes.

The operation of my invention is as follows: The water is introduced into the compartment F' and passes through the filtering material in an inner casing into the lower space and back up through the filtering material between the casings, and finally accumulates in the space E, whence it is drawn off. When the sediment in the lower space has accumulated in sufficient quantity to obstruct the flow, the cock at the lower end is turned and the space cleaned by forcing the water down through a central pipe K, leading from the compartment F' into the lower space, the upper end of the pipe being normally closed. When it is desired to cleanse the filtering material, the filter is reversed and the water introduced into the lower compartment, and to clean the outer compartment the water is introduced into the compartment E' and flows out of the lower plug.

I am aware that many minor changes in the construction and arrangements of the parts of my device can be made and substituted for those herein shown and described without in the least departing from the nature and principle of my invention.

Having thus described my invention, what I claim as new, and desire to secure by Letters Patent, is—

The combination, with the outer and inner casing, of a perforated plate supporting the latter, a pipe extending through the inner casing, a perforated plate in the upper end of the inner casing, a perforated plate between the casings near the top, and cocks for drawing off the water; substantially as described.

In testimony whereof I affix my signature in presence of two witnesses.

JAMES H. MILLEN.

Witnesses:
J. E. EDMONDSON,
THOS. J. FARR.